United States Patent
Su et al.

(10) Patent No.: US 10,050,821 B2
(45) Date of Patent: Aug. 14, 2018

(54) RECEIVING CIRCUIT FOR ESTIMATING FREQUENCY OFFSET AND ASSOCIATED METHOD

(71) Applicant: MStar Semiconductor, Inc., Hsinchu Hsien (TW)

(72) Inventors: Yu-Che Su, Zhubei (TW); Yi-Ying Liao, Zhubei (TW); Kuan-Chou Lee, Zhubei (TW); Tai-Lai Tung, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/987,915

(22) Filed: Jan. 5, 2016

(65) Prior Publication Data
US 2017/0244589 A1    Aug. 24, 2017

(30) Foreign Application Priority Data
Oct. 8, 2015   (TW) .............................. 104133188 A (51) Int. Cl.
*H04L 27/06* (2006.01)
*H04L 27/38* (2006.01)

(52) U.S. Cl.
CPC ................................ *H04L 27/3854* (2013.01)

(58) Field of Classification Search
None
See application file for complete search history.

(56) References Cited

U.S. PATENT DOCUMENTS

| 7,228,113 | B1* | 6/2007 | Tang | H04B 7/0845 |
| | | | | 370/334 |
| 2009/0220015 | A1* | 9/2009 | Fu | H04L 27/2659 |
| | | | | 375/260 |
| 2015/0271001 | A1* | 9/2015 | Lanoiselee | H04L 27/2621 |
| | | | | 375/260 |
| 2017/0201409 | A1* | 7/2017 | Lee | H04B 1/1081 |

* cited by examiner

*Primary Examiner* — Shuwang Liu
*Assistant Examiner* — Gina Mckie
(74) *Attorney, Agent, or Firm* — Edell, Shapiro & Finnan, LLC (57) ABSTRACT

A receiving circuit capable of estimating frequency offset includes a front circuit and a calculation circuit. The front circuit receives a remote signal to generate a received signal. The calculation circuit includes: an exponentiation module, calculating an exponent of a power to generate a high-order signal; a frequency-domain transform module, performing frequency-domain transform on the high-order signal to generate a spectrum; a peak searching module, searching for a peak of the amplitude of the spectrum to generate a peak coordinate value reflecting a frequency where the peak occurs; an offset estimating module, adding the peak coordinate value with a compensation value to generate a sum, dividing the sum by a first divisor to generate a remainder, subtracting the compensation value from the remainder to generate a difference, and dividing the difference by a second divisor to generate an offset estimation value reflecting the frequency offset.

14 Claims, 5 Drawing Sheets

RECEIVING CIRCUIT FOR ESTIMATING FREQUENCY OFFSET AND ASSOCIATED METHOD

This application claims the benefit of Taiwan application Serial No. 104133188, filed Oct. 8, 2015, the subject matter of which is incorporated herein by reference.

BACKGROUND OF THE INVENTION

Field of the Invention

The invention relates in general to a receiving circuit capable of estimating frequency offset and an associated method, and more particularly to a receiving circuit for estimating frequency offset under multipath interference and an associated method.

Description of the Related Art

Receiving remote signals is one of the most common functions in a modern information device. To receive a wireless or wired remote signal from a remote transmitting circuit, an information device is provided with a receiving circuit. The transmitting circuit converts and modulates a baseband signal to a radio-frequency (RF) transmitting signal according to a local frequency at the transmitting circuit, and transmits and propagates the RF transmitting signal. The transmitting signal is propagated to the receiving circuit and becomes an RF remote signal that is then received by the receiving circuit. The receiving circuit down-converts and demodulates the remote signal to recover the baseband signal.

However, due to mismatch between the local frequency at the transmitting circuit and the local frequency at the receiving circuit, a difference, i.e., a frequency offset, is present between the two. Thus, the transmitting circuit needs to estimate the frequency offset in order to correctly perform the down-conversion and signal recovery. Further, the transmitting signal may encounter various kinds of propagation interference when being propagated to the receiving circuit, including multipath interference. Propagation interference affects the estimation of frequency offset and causes an error in the estimation.

SUMMARY OF THE INVENTION

To prevent propagation interference from affecting the estimation of frequency offset, it is an object of the present invention to provide a receiving circuit for estimating frequency offset. The receiving circuit includes a front circuit and a calculation circuit. The front circuit receives a remote signal yRF(t) transmitted from a transmitting circuit and accordingly generates a received signal y(t). The calculation circuit, coupled to the front circuit, includes an exponentiation circuit, a frequency-domain transform module, a peak searching module and an offset estimating module. The exponentiation module calculates an exponent P of a power to generate a high-order signal yp(t). The frequency-domain transform module performs a frequency-domain transform on the high-order signal to generate a spectrum Z(f). The peak searching module searches for a peak max|Z(f)| of the amplitude |Z(f)| of the spectrum to accordingly generate a peak coordinate value fM that reflects a frequency f at which the peak max|Z(f)| occurs. The offset estimating module adds the peak coordinate value with a compensation value f_half to generate a sum (fM+f_half), divides the sum by a first divisor d1 to generate a remainder ((fM+f_half) % d1), subtracts the compensation value from the remainder to generate a difference {((fM+f_half) % d1)−f_half}, and divides the difference by a second divisor {((fM+f_half) % d1)−f_half}/d2 to generate an offset estimation value. The offset estimation value reflects the frequency offset between a local frequency of the transmitting circuit and a local frequency of the receiving circuit.

In one embodiment, the received signal includes multiple symbols having a symbol frequency Fs. For example, each symbol lasts for one symbol cycle T, and the symbol frequency Fs may equal to a reciprocal of the symbol cycle T, ie.g., Fs=1/T. The offset estimating module further sets the first divisor d1 according to the symbol frequency Fs. For example, the offset estimating module may cause the first divisor to be equal to the symbol frequency. In one embodiment, the offset estimating module may further set the compensation value f_half according to the symbol frequency Fs. For example, the offset estimating module sets the compensation value according to a half of the symbol frequency (i.e., Fs/2). In one embodiment, the offset estimating module may further set the second divisor d2 according to the exponent P. For example, the offset estimating module may cause the second divisor to be equal to the exponent.

In one embodiment, the transmitting circuit generates the remote signal according to quadrature phase shift keying (QPSK) modulation, and the exponentiation module may set the exponent P to 4. In one embodiment, each of the symbols of the received signal is one selected from a plurality of constellation points c[1] to c[N]. Each constellation point c[n] includes a real part re(cn[n]) and an imaginary part im(c[n]). The exponentiation module may further set the exponent P, such that the exponent P causes a sum $\Sigma_{n=1}^{N}(c[n])^P$ of the constellation points raised to the power of the exponent is not equal to zero.

It is another object of the present invention to provide a method for estimating a frequency offset. The method includes: calculating an exponent P of a power to generate a high-order signal yp(t); performing a frequency-domain transform on the high-order signal to generate a spectrum Z(f); searching for a peak max|Z(f)| of the amplitude |Z(f)| of the spectrum to accordingly generate a peak coordinate value fM that reflects a frequency f at which the peak max|Z(f)| occurs; generating a difference value according to a difference between the peak coordinate value and an integral multiple of a first divisor d1, such that the difference value is between a negative lower limit and a positive upper limit, and absolute values of the positive upper limit and the negative lower limit are equal to a half of the first divisor; and dividing the difference value by a second divisor to generate an offset estimation value. The offset estimation value reflects the frequency offset between a local frequency of a transmitting circuit and a local frequency of a receiving circuit.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
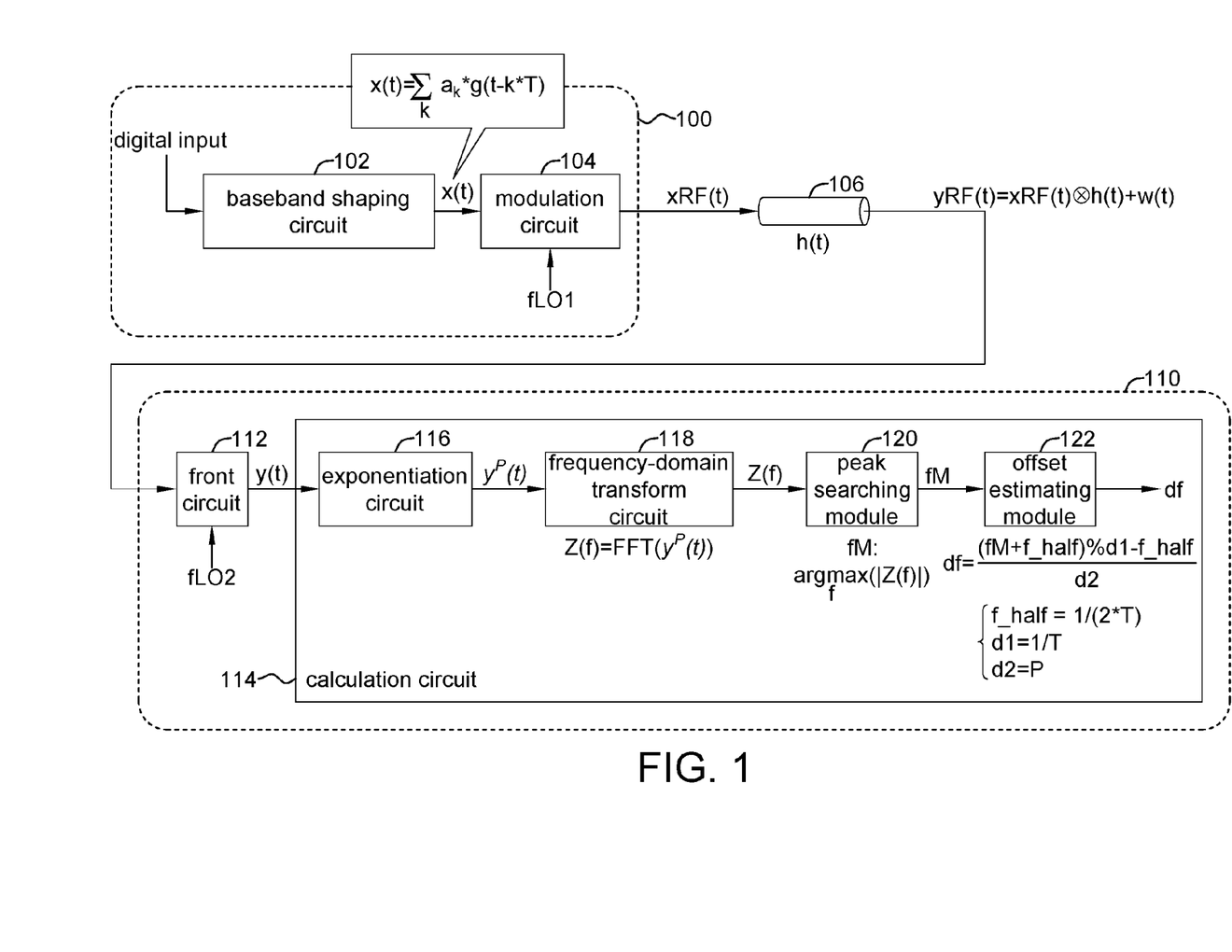
FIG. 1 is a schematic diagram of a receiving circuit according to an embodiment of the present invention.
Figure 2:
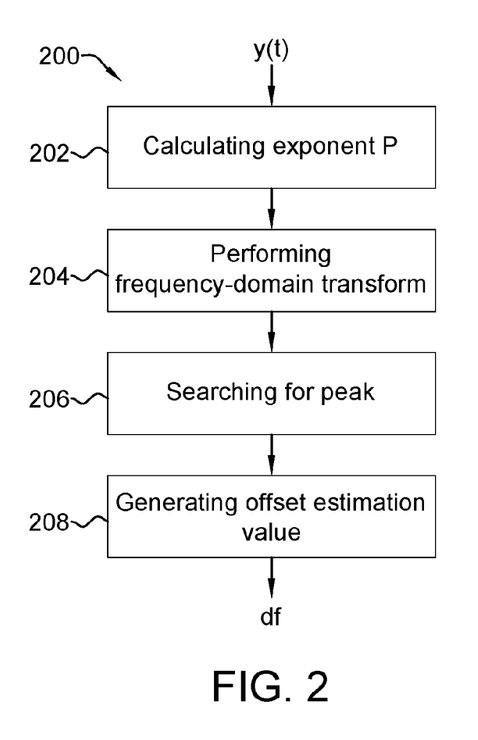
FIG. 2 is a flowchart of a method according to an embodiment of the present invention.

FIG. 1 shows a schematic diagram of a receiving circuit 110 according to an embodiment of the present invention. FIG. 2 shows a process 200 according to an embodiment of the present invention. Referring to FIG. 1 and FIG. 2, the receiving circuit 110 may perform the process 200 to estimate a frequency offset. As shown in FIG. 1, the receiving system 110 may be applied with a transmitting circuit 100 to form a transceiving system. For example, the transceiving system may be a satellite or cable digital video broadcasting (DVB) system, the transmitting circuit 100 may be disposed at a satellite or a server, and the receiving circuit 110 may be disposed on a satellite television set-up-box or cable television set-up-box. Alternatively, the receiving circuit 110 may also be disposed in a television or portable smart device.

Figure 3:
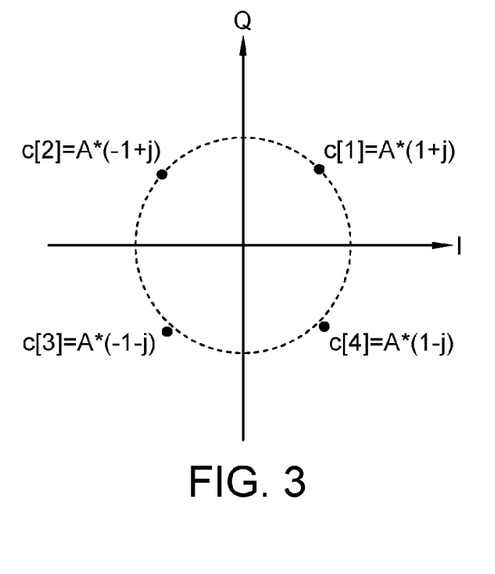
FIG. 3 is a schematic diagram of an exemplary distribution of constellation points.

The transmitting circuit 100 includes a baseband shaping circuit 02 and a modulation circuit 104. The baseband shaping circuit 102 generates a baseband signal x(t) corresponding to a digital input to be transmitted. The baseband signal x(t) may be represented as $\Sigma_k a_k * g(t-k*T)$, where a constellation point $a_k$ reflects digital contents of the $k^{th}$ symbol, a time-domain function g(t−k*T) is the waveform of the $k^{th}$ symbol, e.g., a waveform obtained through a square root raised cosine filter process, T is a symbol cycle, i.e., the duration of one symbol, and a reciprocal 1/T of the symbol cycle T is a symbol rate Fs. Each symbol constellation point $a_k$ may be selected from a plurality of constellation points according to the digital contents of the symbol, e.g., 4 constellation points c[1] to c[4] shown in FIG. 3. FIG. 3 depicts constellation points based on QPSK modulation. Each constellation points c[n] of the constellation points c[1] to c[4] may be represented as a complex variable that includes a real part re(c[n]) and an imaginary part im(c[n]), which respectively represent an in-phase (denoted as "I" in FIG. 3) component and a quadrature-phase (denoted as "Q") component. For example, the constellation points c[1] to c[4] may be A*(1+j), A*(−1+j), A*(−1−j) and A*(1−j) that represent binary digital contents "00", "10", "11" and "01", where j is the square root of −1, and A is a constant.

In the transmitting circuit 100, a modulation circuit 104 may up-convert and modulate the baseband signal x(t) according to a local frequency fLO1 at the transmitting circuit to a radio-frequency (RF) transmitting signal xRF(t), and transmit the transmitting signal xRF(t). For example, the signal xRF(t) may be represented as $$\Sigma_k \{re(a_k) * \cos(2*\pi f LO1*t) + im(a_k) * \sin(2*\pi * fLO1*t)\}.$$

The signal xRF(t) is propagated to the receiving circuit 110 and becomes an RF remote signal yRF(t) received by the receiving circuit 110. The propagation process of the signal xRF(t) into the signal yRF(t) may be modelized into a channel 106. An effect of the channel 106 on the signal xRF(t) may be represented as a pulse response h(t). Thus, the signal yRF(t) may be represented as xRF(t)⊗h(t)+w(t), where the item w(t) may be additive white Gaussian (AWG) noise.

The receiving circuit 110 includes a front circuit 112 and a calculation circuit 114. The front circuit 112 receives the remote signal yRF(t), and down-converts and demodulates the signal yRF(t) according to a local frequency fLO2 of the receiving circuit, and filters the down-converted and demodulated signal to generate a baseband received signal y(t). In the receiving circuit 110, the front circuit 112 may include (not shown) a demodulation and down-conversion circuit, a low-pass filter (e.g., a filter for counteracting adjacent channel interference (ACI)), an analog-to-digital converter (ADC), a decimator, and a symbol detecting circuit. As mismatch exists between the local frequency fLO1 of the transmitting circuit and the local frequency fLO2 of the receiving circuit, there is a frequency offset dF (not shown in FIG. 1) between the two. The calculation circuit 114 is capable of calculating an offset estimation value df according to the signal y(t) to reflect the real frequency offset dF. The calculation circuit 114 includes an exponentiation module 116, a frequency-domain transform module 118, a peak searching module 120, and an offset estimating module 122, which respectively correspond to steps 202, 204, 206 and 208 in the process 200. Associated details are given below.

In step 202, the exponentiation module 116 sets an exponent P, and calculates the received signal y(t) raised to the power of the exponent P to generate a high-order signal $y^P(t)$. Similar to the signal x(t), the signal y(t) also includes a real part re(y(t)) and an imaginary part im(y(t)), i.e., y(t)=re(y(t))+j*im(y(t)). The high-order signal $y^P(t)$ calculated by the calculation circuit 114 may be represented as $\{re(y(t))+j*im(y(t))\}^P$. In one embodiment, as the transmitting circuit 100 generates the signal xRF(t) according to QPSK modulation, the exponentiation module 116 may set the exponent P to 4, i.e., $y^P(t)=y^4(t)=re(y(t))^4+4*j*e(y(t))^3*im(y(t))-6*re(y(t))^2*im(y(t))^2-4*j*re(y(t))*im(y(t))^3+im(y(t))^4$. In QPSK, the exponent P may also be a multiple of 4.

In one embodiment, each constellation point of the symbols is one selected from N constellation points c[1] to c[N], and the exponentiation module 116 sets the exponent P in a way that the total $\Sigma_{n=1}^{N} c[n]^P$ of the constellation point c[n] raised to the power of the exponent P is not equal to zero. For example, if the transmitting circuit 100 adopts 8 PSK, the exponent P may be set to a multiple of 8, e.g., 8 or 16. If the transmitting circuit 100 adopts 16 PSK, the exponent P may be set to a multiple of 16, e.g., 16 or 32. If the transmitting circuit 100 adopts 4QAM (quadrature amplitude modulation), 16QAM, 64QAM or 256QAM, the exponent P may be set to a multiple of 4, e.g., 4 or 8.

In step 204, the frequency-domain transform module performs frequency-domain transform (e.g., fast Fourier transform (FFT)) on the high-order signal $y^P(t)$ to generate a spectrum Z(f).

In step 206, the peak searching module 120 searches for a global peak max|Z(f)| of the amplitude |Z(f)| of the spectrum Z(f) to accordingly generate a frequency-domain peak coordinate value fM that reflects a frequency at which the peak value max|Z(f)| occurs. That is, the peak coordinate value fM reflects argmax$_f$|Z(f)|. In another embodiment, the peak searching module 120 may also search for a peak frequency of a spectrum amplitude $|Z(f)|^2$.

In step 208, the offset estimating module 122 calculates an offset estimation value df according to the peak coordinate value fM, the symbol frequency Fs (which may be provided by the front circuit 112) and the exponent P (provided by the exponentiation module 116 in step 202) to reflect the frequency offset dF between the local frequency fLO1 of the transmitting circuit and the local frequency fLO2 of the receiving circuit. In one embodiment, to calculate the offset estimation value df, the offset estimating module 122 may add the peak coordinate value fM with a compensation value f_half to generate a sum (fM+f_half). The offset estimating module 122 may set the compensation value f_half according to the symbol frequency Fs, e.g., f_half=(½)*Fs. Next, the offset estimating module 122 divides the sum (fM+f_half) by a first divisor d1 to provide a remainder (fM+f_half) % d1. The offset estimating module 122 may set the first divisor d1 according to the symbol frequency Fs, e.g., d1=Fs. The offset estimating module 122 then subtracts the compensation value f_half from the remainder (fM+f_half) % d1 to generate a difference {(fM+f_half) % d1−f_half)}, and divides the difference {(fM+f_half) % d1−f_half)} by a second divisor d2 to generate the offset estimation value df. The offset estimating module 122 may set the second divisor d2 according to the exponent P, e.g., d2=P. That is, in one embodiment, the offset estimation value df={(fM+Fs/2)% Fs−Fs/2}/P.

As to be described shortly, after the exponentiation of raising to the power of the exponent P in step 202 and the frequency-domain transform in step 204, the peak coordinate value fM (step 206) of the peak in the amplitude |Z(f)| may be represented as (L*Fs+P*dF), where Fs is the symbol frequency, L is an integer, and dF is the frequency offset. In other words, the peak coordinate value fM is associated with an integral multiple of the symbol frequency Fs added by P times of the frequency offset dF. The frequency offset dF may be a positive value or a negative value, and the product P*dF is between a frequency-domain lower limit (−Fs/2) and a frequency-domain upper limit (+Fs/2).

In the calculation of {(fM+Fs/2)% Fs−Fs/2}/P for generating the offset estimation value dF, as the peak coordinate value fM may be represented as (L*Fs+P*dF), the sum (fM+Fs/2) may be represented as {L*Fs+(P*dF+Fs/2), and the remainder may be represented as (P*dF+Fs/2). Because P*dF is between the frequency-domain lower limit (−Fs/2) and upper limit (+Fs/2), and the compensation value f_half=Fs/2 causes the value of (P*dF+Fs/2) to fall between the frequency-domain range 0 to Fs, the remainder of dividing the sum (fM+Fs/2) by Fs exactly removes the item L*Fs and keeps the item (P*dF+Fs/2). Further, P*dF is obtained by subtracting the compensation value Fs/2 from the remainder (P*dF+Fs/2), and the frequency offset dF can be obtained by dividing P*dF by P.

Figure 4A:
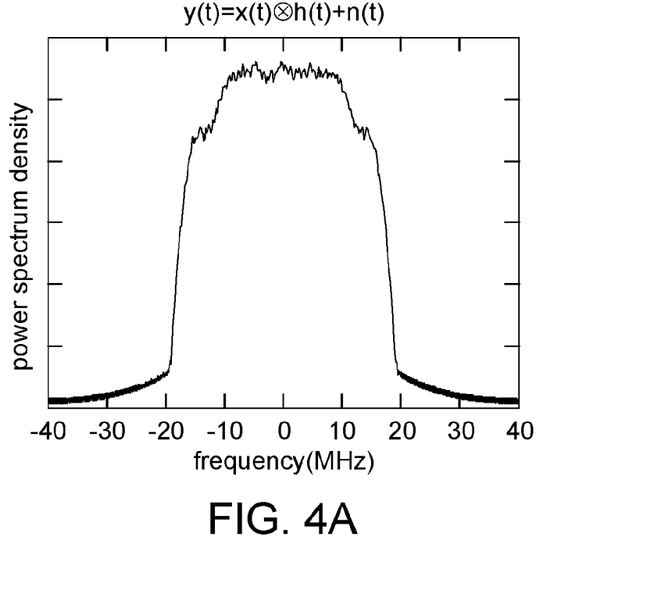
FIG. 4A and FIG. 4B are schematic diagrams of a power spectrum density of a received signal and the spectrum amplitude of a high-order signal under conditions of no frequency offset and no multipath interference, respectively.

In continuation of FIG. 1 and FIG. 2, FIG. 4A and FIG. 4B are schematic diagrams of a power spectrum density of the received signal y(t) and the spectrum amplitude |Z(f)| of the high-order signal $y^P(t)$ under conditions of no frequency offset and no multipath interference, respectively. In the two diagrams, the horizontal axis is the frequency (in a unit of MHz). Under conditions of no frequency offset and no multipath interference, the signal y(t) may be represented as x(t)⊗h(t)+n(t), i.e., the convolution of the signal x(t) and the channel response h(t) added with noise n(t), where the noise n(t) is the noise w(t) after the low-pass filtering of the front circuit 112. In FIG. 4A, the power spectrum density is associated with the spectrum of the symbols in the signal y(t). In the examples in FIG. 4A and FIG. 4B, the transmitting circuit 100 generates a modulated signal by QPSK, the symbol frequency Fs is 20 MHz, the signal-to-noise ratio (SNR) of the noise w(t) of the channel 106 is 10 dB, and the pass-band of the low-pass filter counteracting the ACI in the front circuit 112 is 15 MHz. In response to QPSK, the exponentiation module 116 in the calculation circuit 114 sets the exponent P to 4. Thus, after the front circuit 112 receives the signal yRF(t) and obtains the signal y(t) after down-conversion and filtering, the exponentiation module 116 calculates the high-order signal $y^4(t)$ (step 202), the frequency-domain transform module 118 performs the frequency transform on the signal $y^4(t)$ to obtain the spectrum Z(f) (step 204), and the peak searching module 120 searches for the peak max|Z(f)| from the spectrum amplitude |Z(f)| to identify the peak coordinate value fM (step 206).

Figure 4B:
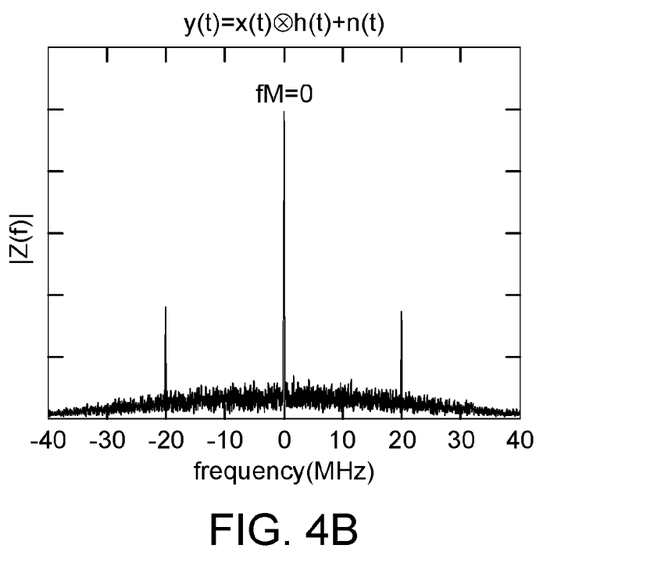

As shown in FIG. 4B, without any frequency offset and without any multipath interference, the peak coordinate value fM of the spectrum amplitude |Z(f)| is located at 0 MHz, and the offset estimation value df calculated by the offset estimating module 122 is df={(fM+Fs/2)% Fs−Fs/2}/P={(0+10)%20)−10}/4={10−10}/4=0 (step 208), thus correctly reflecting the condition of no frequency offset.

In continuation of FIG. 1 and FIG. 2, FIG. 5A and FIG. 5B are schematic diagrams of a power spectrum density of the received signal y(t) and the spectrum amplitude |Z(f)| of the high-order signal $y^P(t)$ under conditions of the presence of frequency offset and no multipath interference, respectively. In the two diagrams, the horizontal axis is the frequency (in a unit of MHz). Under conditions of the presence of frequency offset and no multipath interference, the signal y(t) may be represented as {exp(j*2*π*dF*t)*x(t)}⊗h(t)+n(t), where dF is the actual frequency offset. Same as the examples in FIG. 4A and FIG. 4B, in the examples in FIG. 5A and FIG. 5B, the transmitting circuit 100 generates a modulated signal according to QPSK, the symbol frequency Fs is 20 MHz, the SNR of the channel noise w(t) is 10 dB, and the band-pass of the low-pass filter counteracting the ACI in the front circuit 112 is 15 MHz. Further, the frequency offset dF may be equal to 2 MHz. In response to QPSK, the exponentiation module 116 may set the exponent P to 4. Thus, after the front circuit 112 receives the signal yRF(t) and obtains the signal y(t) after down-conversion and filtering, the exponentiation module 116 calculates the high-order signal $y^4(t)$ (step 202), the frequency-domain transform module 118 performs the frequency transform on the signal $y^4(t)$ to obtain the spectrum Z(f) (step 204), and the peak searching module 120 searches for the peak max|Z(f)| from the spectrum amplitude |Z(f)| to identify the peak coordinate value fM (step 206).

Figure 5A:
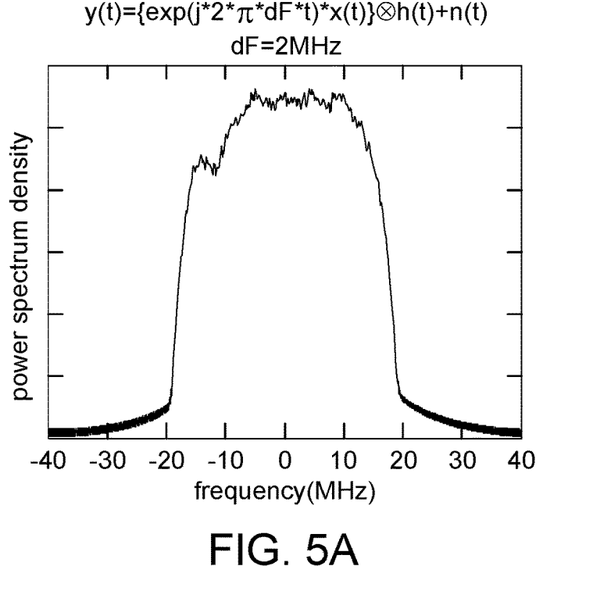
FIG. 5A and FIG. 5B are schematic diagrams of a power spectrum density of a received signal and the spectrum amplitude of a high-order signal under conditions of the presence of frequency offset and no multipath interference, respectively.
Figure 5B:
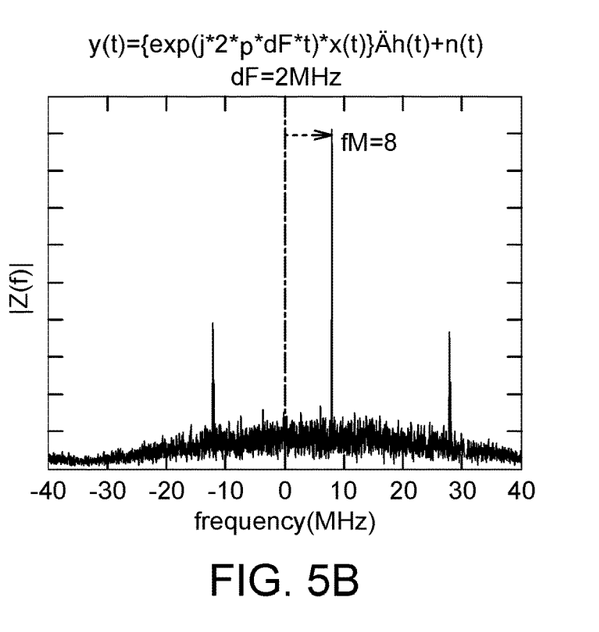

As shown in FIG. 5B, if the actual frequency offset df=2 MHz and there is no multipath interference, the peak coordinate value fM of the spectrum amplitude |Z(f)| is located at 8 MHz, and the frequency estimation value df calculated by the offset estimating module 122 is df={(fM+Fs/2)% Fs−Fs/2}/P={(8+10)%20)−10}/4={18−10}/4=8/4=2 (step 208), hence correctly reflecting the frequency offset dF of 2 MHz.

On the other hand, if the frequency offset dF is −2 MHz (not shown) and there is not multipath interference, the peak coordinate value fM of the spectrum amplitude |Z(f)| is located at −8 MHz (not shown), and the frequency estimation value df calculated by the offset estimating module 122 is df={(fM+Fs/2)% Fs−Fs/2}/P={(−8+10)%20)−10}/4={2−10}/4=−8/4=−2 (step 208), hence correctly reflecting the frequency offset dF of −2 MHz.

In continuation of FIG. 1 and FIG. 2, FIG. 6A and FIG. 6B show schematic diagrams of a power spectrum density of the received signal y(t) and the spectrum amplitude |Z(f)| of the high-order signal $y^P(t)$ under conditions of the presence of frequency offset and the presence of multipath interference, respectively. In the two diagrams, the horizontal axis represents the frequency (in a unit of MHz). Under conditions of the presence of frequency offset and the presence of multipath interference, the signal y(t) may be represented as ys(t)+exp(j*φ)*ys(t−dT)+n(t), where ys(t) may be represented as {exp(j*2*πdF*t)*x(t)} ⊗ h(t), i.e., a signal of one single path but containing frequency offset, and exp(j*φ)*ys(t−dT) represents the signal of another path, where φ represents an additional phase on the path, and dt represents the time difference between different paths. Same as the examples in FIG. 4A and FIG. 4B, in the examples in FIG. 6A and FIG. 6B, the transmitting circuit 100 generates a modulated signal according to QPSK, the symbol frequency Fs is 20 MHz, the SNR of the channel noise w(t) is 10 dB, and the pass-band of the low-pass filter for counteracting ACI in the front circuit 112 is 15 MHz. Further, actual frequency offset dF is equal to 2 MHz, the phase φ is 1.2, and the time difference dT is 0.01 μs.

Figure 6A:
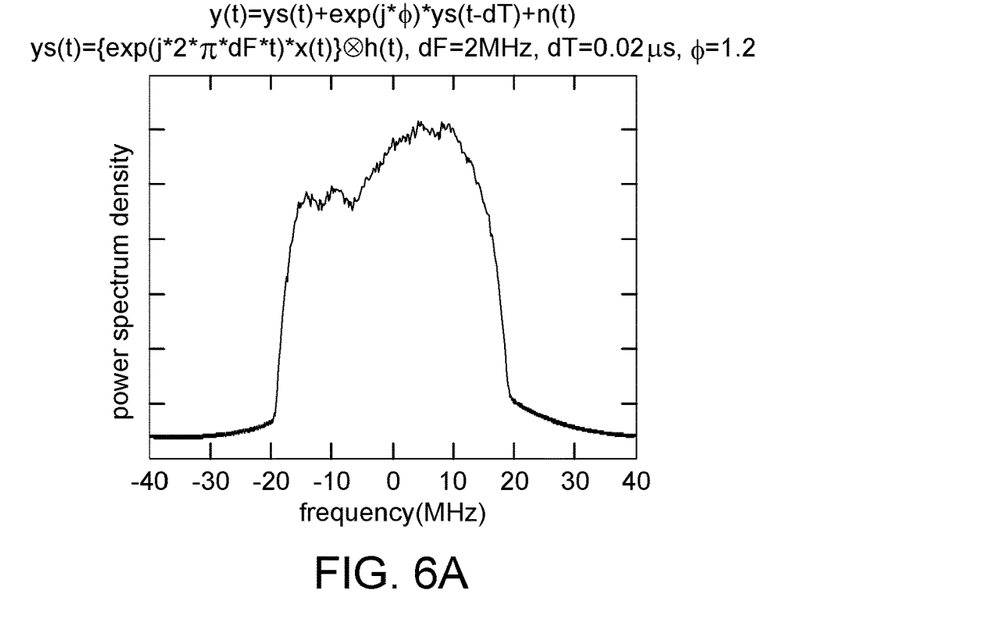
FIG. 6A and FIG. 6B are schematic diagrams of a power spectrum density of a received signal and the spectrum amplitude of a high-order signal under conditions of the presence of frequency offset and the presence of multipath interference, respectively.
Figure 6B:
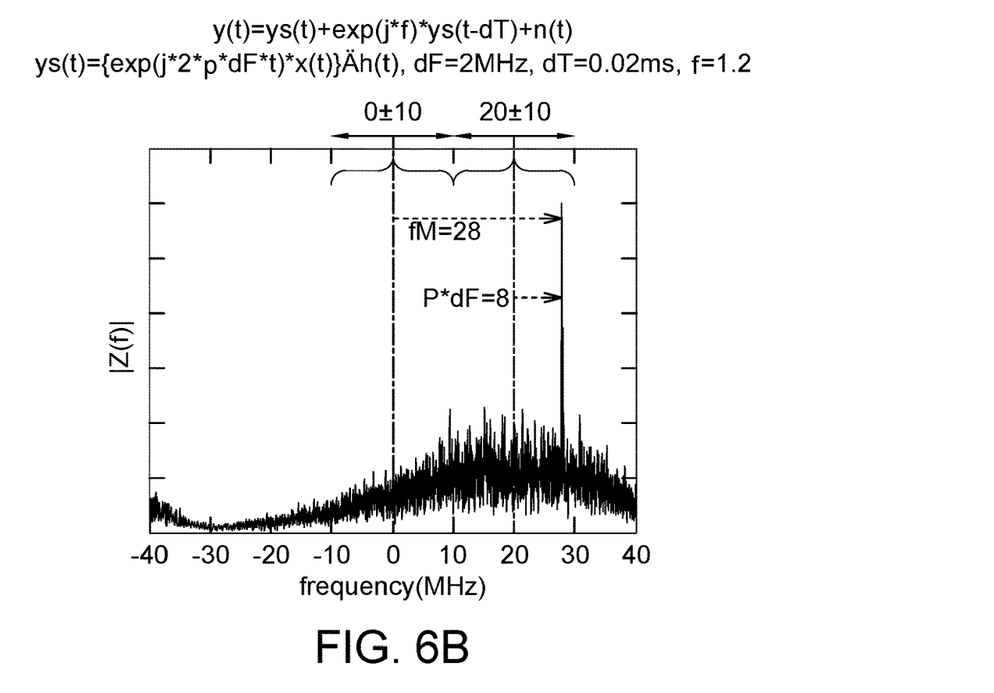

In response to QPSK, the exponentiation module 116 may set the exponent P to 4. Thus, after the front circuit 112 receives the signal yRF(t) and obtains the signal y(t) after down-conversion and filtering, the exponentiation module 116 calculates the high-order signal $y^4(t)$ (step 202), the frequency-domain transform module 118 performs the frequency transform on the signal $y^4(t)$ to obtain the spectrum Z(f) (step 204), and the peak searching module 120 searches for the peak max|Z(f)| from the spectrum amplitude |Z(f)| to identify the peak coordinate value fM (step 206).

As shown in FIG. 6B, if the frequency offset dF=2 MHz and there is multipath interference, the peak coordinate value fM of the spectrum amplitude |Z(f)| is located at 28 MHz, and the offset estimation value df calculated by the offset estimating module 122 is df={(fM+Fs/2)% Fs−Fs/2}/P={(28+10)%20)−10}/4={18−10}/4=8/4=2 (step 208), hence correctly reflecting the frequency offset of 2 MHz, even when multipath interference is present. On the other hand, if the frequency offset dF=−2 MHz and there is multipath interference, the peak coordinate value fM of the spectrum amplitude |Z(f)| is located at 12 MHz (not shown), and the offset estimation value df calculated by the offset estimating value 122 is df={(fM+Fs/2)% Fs−Fs/2}/P={(12+10)%20)−10}/4={2−10}/4=−8/4=−2 (step 208), hence correctly reflecting the frequency offset dF of −2 MHz even in the presence of multipath interference.

Comparing the examples in FIG. 4B and FIG. 5B, it is known that, in the spectrum Z(f) of the high-order signal $y^P(t)$ when P=4, the 2 MHz frequency offset dF causes the peak coordinate value fM to change from 0 MHz in FIG. 4B to 8 MHz in FIG. 5B, i.e., fM=P*dF. Comparing the examples in FIG. 5B and FIG. 6B, it is known that, although the actual frequency offsets dF in these two examples are both equal to 2 MHz, the multipath interference in FIG. 6B causes the peak coordinate value fM to change from 8 MHz in FIG. 5B to 28 MHz in FIG. 6. In fact, the multipath interference causes the peak coordinate value fM to additionally shift by an integral multiple of the symbol frequency Fs, i.e., fM=P*dF+L*Fs, where L is an integer.

In one prior art, the offset estimation value df is calculated by dividing the peak coordinate value fM by the exponent P, i.e., df=fM/P. For example, in the example in FIG. 5B, the peak coordinate value fM=8 MHz, and it is learned that the frequency offset is 2 MHz by directly dividing by P=4. However, such prior art cannot be correctly applied to conditions containing multipath interference. For example, in the example in FIG. 6, the peak coordinate value fM=28 MHz, and the offset estimation value df obtained from directly dividing by P=4 is equal to 28/4=7, which does not correctly reflect the real frequency offset dF=2 MHz.

In comparison, the offset estimating module 122 in the calculation circuit 114 in an embodiment of the present invention first removes the integral multiple of the symbol frequency Fs from the peak coordinate value fM (e.g., {(fM−Fs/2)% Fs+Fs/2}), and divides a result by the exponent P, thereby correctly reflecting the real frequency offset dF (step 208).

In another embodiment, the offset estimating module 122 may also calculate {fM−Fs*round(fM/Fs)}/d to generate the offset estimation value df, where the function round(r) is an integer closest to the variable r. In other words, round(fM/Fs) is for calculating the integral multiple L, and the integral multiple Fs*round(fM/Fs) of the symbol frequency is subtracted from the peak coordinate value fM. For example, in the example in FIG. 6B, the peak coordinate value fM=28, and the offset estimation value df may also be calculated as {28−20*round(28/20)}/4={28−20*round(1.4)}/4={28−20}/4=8/4=2. On the other hand, if the actual frequency offset dF=−2 MHz and there is multipath interference, the peak coordinate value fM is located at 12 MHz (not shown), and the offset estimation value df may be calculated as {12−20*round(12/20)}/4={12−20*round(0.6)}/4={12−20}/4=−8/4=−2.

In another embodiment, the offset estimating module 122 may remove the integral multiple of the symbol frequency Fs from the peak coordinate value by applying an inverse function associated with the cycle function. For example (Fs/π)*tan⁻¹(tan(π*fM/Fs))/P may be calculated to generate the offset estimation value df.

In another embodiment, the offset estimating module 122 may calculate the offset estimation value df by iteration calculation. The offset estimating module 122 may check whether the peak coordinate value fM is in a frequency range (−Fs/2, Fs/2). If so, fM/P may be directly calculated to generate the offset estimation value df. If the peak coordinate value fM is greater than the range (−Fs/2, Fs/2), a value that is once the symbol frequency Fs may be first subtracted from the peak coordinate value fM to obtain a first difference (fM−Fs), and check whether the first difference (fM−Fs) is in the range (−Fs/2, Fs/2). If so, the first difference (fM−Fs) may be divided by the exponent P to generate the offset estimation value df. If the first difference (fM−Fs) is still greater than the range (−Fs/2, Fs/2), a value that is once the symbol frequency Fs may be again subtracted from the first difference (fM−Fs) to obtain a second difference (fM−2*Fs), and it is checked whether the second difference (fM−2*Fs) is in the range (−Fs/2, Fs/2). If so, the second difference (fM−2*Fs) is divided by the exponent P to generate the offset estimation value df. If the second difference (fM−2*Fs) is still greater than the range (−Fs/2, Fs/2), a value that is once the symbol frequency Fs may be again subtracted from the second difference (fM−2*Fs) to obtain a third difference (fM−3*Fs), and so forth.

The offset estimation value df generated by the calculation circuit 114 may serve as a reference for compensating the frequency offset. For example, a mixer (not shown) may be disposed in the front circuit 112 in FIG. 1, and the mixer may perform a compensative mixing process according to the offset estimation value df to cancel the frequency offset dF. Further/Alternatively, the receiving circuit 110 may compensate the frequency offset in a back-end process (e.g., symbol recovery) of the baseband received signal y(t).

The function modules 116 to 122 of the calculation module 114 may be implemented by dedicated hardware circuits, or may be implemented by operation logic circuits that execute software or firmware. For example, the frequency-domain transform module 118 may be implemented by hardware, and the offset estimating module 122 may be implemented by an operation logic circuit that executes firmware. It should be noted that, one person skill in the art can readily realize the technical contents of the present invention using technical means (including software, firmware and/or hardware) of the technical field based on the teaching of the above disclosure. Such details are omitted herein.

In conclusion, the present invention calculates a high-order signal according to a received signal, and searches for a peak coordinate value from the spectrum amplitude of the high-order signal. Further, the present invention overcomes multipath interference and additionally introduces an integral multiple symbol period into the peak coordinate value, and correctly estimates the frequency offset between a transmitting circuit and a receiving circuit according a difference between the peak coordinate value and the integral multiple symbol period.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiving circuit for estimating a frequency offset, comprising:
    a front circuit, that receives a remote signal transmitted from a transmitting circuit, and accordingly generates a received signal; and
    a calculation circuit, coupled to the front circuit, the calculation circuit configured to:
    calculate an exponent of a power of the received signal to generate a high-order signal;
    perform frequency-domain transform on the high-order signal to generate a spectrum;
    search for a peak of an amplitude of the spectrum to generate a peak coordinate value reflecting a frequency at which the peak occurs; and
    add the peak coordinate value with a compensation value to generate a sum, divide the sum by a first divisor to generate a remainder, subtract the compensation value from the remainder to generate a first difference, and divide the difference by a second divisor to generate an offset estimation value,
    wherein the offset estimation value reflects the frequency offset between a local frequency of the transmitting circuit and a local frequency of a receiving circuit.

2. The receiving circuit according to claim 1, wherein the received signal comprises a plurality of symbols having a symbol frequency, and the calculation circuit further sets the first divisor according to the symbol frequency.

3. The receiving circuit according to claim 1, wherein the received signal comprises a plurality of symbols having a symbol frequency, and the calculation circuit further sets the compensation value according to the symbol frequency.

4. The receiving circuit according to claim 1, wherein the received signal comprises a plurality of symbols having a symbol frequency, and the calculation circuit further sets the compensation value according to a half of the symbol frequency.

5. The receiving circuit according to claim 1, wherein the calculation circuit further sets the second divisor according to the exponent.

6. The receiving circuit according to claim 1, wherein the calculation circuit further causes the second divisor to be equal to the exponent.

7. The receiving circuit according to claim 1, wherein the transmitting circuit generates the remote signal according to quadrature phase shift keying (QPSK) modulation, and the calculation circuit further sets the exponent to 4.

8. The receiving circuit according to claim 1, wherein the remote signal comprises a plurality of symbols, each of the symbols is one selected from a plurality of constellation points, each of the constellation points comprises a real part and an imaginary part; and the calculation circuit further sets the exponent such that a sum of the constellation points raised to the power of the exponent is not equal to zero.

9. A method for estimating a frequency offset, applied to a receiving circuit, comprising:
    receiving a remote signal transmitted from a transmitting circuit by the receiving circuit, and accordingly generating a received signal;
    calculating an exponent of a power of the received signal to generate a high-order signal;
    performing frequency-domain transform on the received signal to generate a spectrum;
    searching for a peak value of an amplitude of the spectrum to generate a peak coordinate value reflecting a frequency at which the peak occurs;
    generating a difference value between a difference between the peak coordinate value and an integral multiple of a first divisor, the difference value being between a negative lower limit and a positive upper limit, absolute values of the positive upper limit and the negative lower limit being equal to a half of the first divisor; and
    dividing the difference value by a second divisor to generate an offset estimation value; wherein, the estimation value reflects the frequency offset between a local frequency of the transmitting circuit and a local frequency of the receiving circuit.

10. The method according to claim 9, wherein the received signal comprises a plurality of symbols having a symbol frequency, the method further comprising:
    setting the first divisor according to the symbol frequency.

11. The method according to claim 9, further comprising:
    setting the second divisor according to the exponent.

12. The method according to claim 9, further comprising:
    causing the second divisor to be equal to the exponent.

13. The method according to claim 9, wherein the transmitting circuit generates the remote signal according to QPSK modulation, the method further comprising:
    setting the exponent to 4.

14. The method according to claim 9, wherein the remote signal comprises a plurality of symbols, each of the symbols is one selected from a plurality of constellation points, each of the constellation points comprises a real part and an imaginary part; the method further comprising:
    selecting the exponent according to a determination result indicating that a sum of the constellation points raised to the power of the exponent does not equal to zero.

* * * * *